(12) United States Patent
Ulrich

(10) Patent No.: US 12,159,429 B2
(45) Date of Patent: Dec. 3, 2024

(54) HAND-EYE CALIBRATION OF CAMERA-GUIDED APPARATUSES

(71) Applicant: MVTec Software GmbH, Munich (DE)

(72) Inventor: Markus Ulrich, Munich (DE)

(73) Assignee: MVTec Software GmbH, Munich (DE)

( * ) Notice: Subject to any disclaimer, the term of this patent is extended or adjusted under 35 U.S.C. 154(b) by 245 days.

(21) Appl. No.: 17/824,276

(22) Filed: May 25, 2022

(65) Prior Publication Data
US 2022/0383547 A1    Dec. 1, 2022

(30) Foreign Application Priority Data

May 26, 2021   (EP) ..................................... 21175927

(51) Int. Cl.
| | |
|---|---|
| G06T 7/80 | (2017.01) |
| B25J 9/16 | (2006.01) |
| G06T 1/00 | (2006.01) |
| G06T 7/33 | (2017.01) |
| G06V 10/22 | (2022.01) |
| G06V 10/32 | (2022.01) |
| G06V 10/46 | (2022.01) |

(52) U.S. Cl.
CPC ............... *G06T 7/80* (2017.01); *B25J 9/1692* (2013.01); *G06T 1/0014* (2013.01); *G06T 7/344* (2017.01); *G06V 10/225* (2022.01); *G06V 10/32* (2022.01); *G06V 10/462* (2022.01); *G06T 2207/30244* (2013.01)

(58) Field of Classification Search
CPC ......... G06T 7/80; G06T 1/0014; G06T 7/344; G06T 2207/30244; G06T 2207/30204; G06T 7/73; G06T 7/77; B25J 9/1692; B25J 9/1697; B25J 9/1605; B25J 9/161; G06V 10/225; G06V 10/32; G06V 10/462; G05B 2219/39008; G05B 2219/39016; G05B 2219/39045; G05B 2219/39057

See application file for complete search history.

(56) References Cited

U.S. PATENT DOCUMENTS

| | | | | |
|---|---|---|---|---|
| 2011/0280472 | A1* | 11/2011 | Wallack | G06T 7/80 901/14 |
| 2013/0321583 | A1* | 12/2013 | Hager | G06T 7/579 348/46 |
| 2016/0039096 | A1* | 2/2016 | Wallack | G06T 7/80 901/9 |
| 2017/0024613 | A1* | 1/2017 | Shivaram | B25J 9/1697 |
| 2020/0282575 | A1* | 9/2020 | Haeusler | B25J 9/1612 |

OTHER PUBLICATIONS

Abderrahim et al., "Accuracy and Calibration Issues of Industrial Manipulators," Industrial Robotics: Programming, Simulation and Applications, pp. 131-146, 2006, (17 pages).

(Continued)

*Primary Examiner* — Edward F Urban
*Assistant Examiner* — Jongbong Nah
(74) *Attorney, Agent, or Firm* — Kagan Binder, PLLC

(57) ABSTRACT

The invention describes a generic framework for hand-eye calibration of camera-guided apparatuses, wherein the rigid 3D transformation between the apparatus and the camera must be determined. An example of such an apparatus is a camera-guided robot.

9 Claims, 1 Drawing Sheet

(56) References Cited

OTHER PUBLICATIONS

Figure 1:
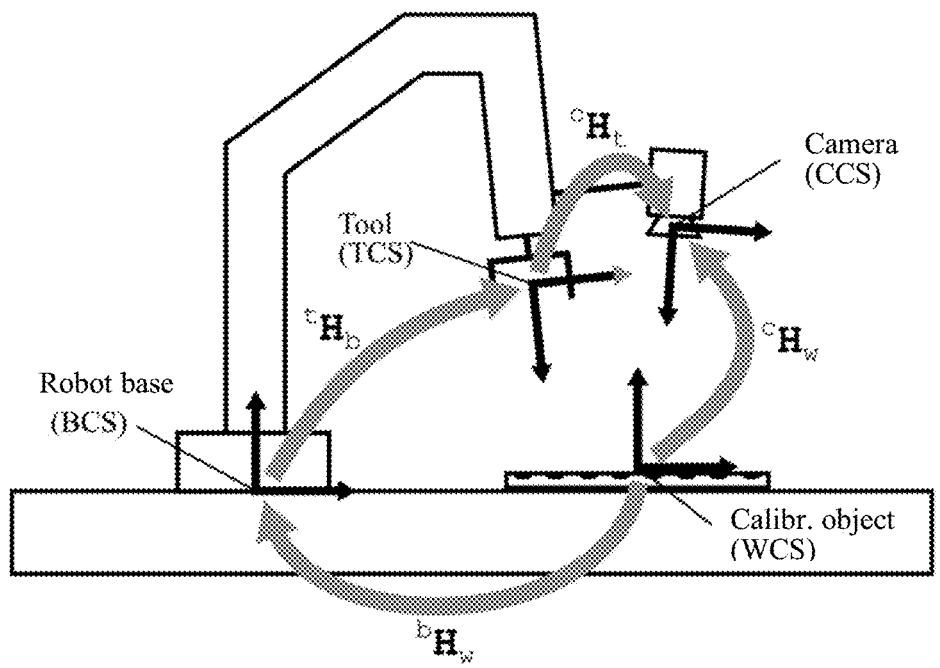

Andreff et al., "Robot Hand-Eye Calibration Using Structure-from-Motion," The International Journal of Robotics Research, vol. 20, No. 3, pp. 228-248, 2001, (21 pages).
Brown, "Close-Range Camera Calibration," Photogrammetric Engineering 37, pp. 855-866, 1971, (12 pages).
Chen, "A Screw Motion Approach to Uniqueness Analysis of Head-Eye Geometry," IEEE Computer Society Conference on Computer Vision and Pattern Recognition, pp. 145-151, 1991, (7 pages).
Daniilidis, "Hand-Eye Calibration Using Dual Quaternions," The International Journal of Robotics Research, vol. 18, Isse. 3, pp. 286-298, 1999, (13 pages).
Dornaika et al., "Simultaneous Robot-World and Hand-Eye Calibration," IEEE Transactions on Robotics and Automation, vol. 14, No. 4, pp. 617-622, 1998, (6 pages).
Forstner et al., "A Framework for Low Level Feature Extraction," Lecture Notes in Computer Science, vol. 801, pp. 383-394, 1994 (12 pages).
Forstner et al., "Photogrammetric Computer Vision," Statistics, Geometry, Orientation and Reconstruction, Geometry and Computing, vol. 11, Springer, 2016, (819 pages).
Harris et al., "A Combined Corner and Edge Detector," Proceedings of the 4th Alvey Vision Conference, pp. 147-151, 1988, (5 pages).
Hofhauser et al., "Perspective Planar Shape Matching," Proceedings of the SPIE, vol. 7251, 2009, (10 pages).
Horaud et al., "Hand-Eye Calibration," The International Journal of Robotics Research, vol. 14, Isse. 3, pp. 195-210, 1995, (16 pages).
Koch, "Parameter Estimation and Hypothesis Testing in Linear Models," Second and Enlarged Edition, Springer, ISBN 978-3-642-08461-4, 1999, (344 pages).
Koch, "Introduction to Bayesian Statistics," Second Edition, Springer, ISBN 978-3-540-72723-1, 2007, (258 pages).
Koide et al., "General Hand-Eye Calibration Based on Reprojection Error Minimization," IEEE Robotics and Automation Letters, vol. 4, No. 2, pp. 1021-1028, 2019, (8 pages).
Lenz et al., "Accuracy of videometry with CCD sensors," ISPRS Journal of Photogrammetry and Remote Sensing, vol. 45, pp. 90-110, 1990, (22 pages).
Lowe, "Distinctive Image Features from Scale-Invariant Keypoints," International Journal of Computer Vision, vol. 60, No. 2, pp. 91-110, 2004, (20 pages).
Nguyen et al., "On the Covariance ofX in AX=XB," IEEE Transactions on Robotics, vol. 34, No. 6, pp. 1651-1658, (2018, ( 8 pages).
Zhang, "A Flexible New Technique for Camera Calibration," IEEE Transactions on Pattern Analysis and Machine Intelligence, vol. 22, No. 11, pp. 1330-1334, 2000, (5 pages).

"OpenCV: Camera Calibration and 3D Reconstruction," Version 4.5.2, Open CV module calib3d, retrieved from https://docs.opencv.org/4.5.2/d9/d0c/group_calib3d.html, retrieved on Apr. 7, 2021, (42 pages).
Placzek et al., "Testing of an industrial robot's accuracy and repeatability in off and online environment," Maintenance and Reliability vol. 20, No. 3, pp. 455-464, 2018, (32 pages).
Schmidt et al., "Robust Hand-Eye Calibration of an Endoscopic Surgery Robot Using Dual Quaternions," in Pattern Recognition, B. Michaelis and G. Krell, Eds. Springer, Berlin Heidelberg, pp. 548-556, 2003, (9 pages).
Schmidt et al., "Calibration-Free Hand-Eye Calibration: A Structure-from-Motion Approach," in Pattern Recognition, W. G. Kropatsch, R. Sablatnig, and A. Hanbury, Eds. Springer Berlin Heidelberg, pp. 67-74, 2005, (8 pages).
Schmidt et al., "Data Selection for Hand-eye Calibration: A Vector Quantization Approach," The International Journal of Robotics Research, vol. 27, Issu. 9, pp. 1027-1053, 2008, (27 pages).
Schonberger et al., "Pixelwise View Selection for Unstructured Multi-View Stereo," in European Conference on Computer Vision (ECCV), pp. 501-518, 2016, (18 pages).
Schonberger et al., "Structure-from-Motion Revisited," IEEE Conference on Computer Vision and Pattern Recognition (CVPR), pp. 4104-4113, 2016, (10 pages).
Shiakolas et al., "On the Accuracy, Repeatability, and Degree of Influence of Kinematics Parameters for Industrial Robots," International Journal of Modelling and Simulation, vol. 22, No. 3, 2002, (10 pages).
Steger et al., "Machine Vision Algorithms and Applications," Second, Completely Revised and Enlarged Edition, Wiley-VCH, ISBN: 978-3-527-41365-2, 2018, (521 pages).
Strobl et al., "Optimal Hand-Eye Calibration," IEEE/RSJ International Conference on Intelligent Robots and Systems, pp. 4647-4653, 2006, (7 pages).
Tabb et al., "Solving the robot-world hand-eye(s) calibration problem with iterative methods," Machine Vision and Applications, vol. 28, pp. 569-590, 2017, (22 pages).
Tsai et al., "A New Technique for Fully Autonomous and Efficient 3D Robotics Hand/Eye Calibration," IEEE Transactions on Robotics and Automation, vol. 5, No. 3, pp. 345-358, 1989, (14 pages).
Ulrich et al., "Combining Scale-Space and Similarity-Based Aspect Graphs for Fast 3D Object Recognition," IEEE Transactions on Pattern Analysis and Machine Intelligence, vol. 34, No. 10, pp. 1902-1914, 2012, (13 pages).
Ulrich et al., "Hand-Eye Calibration of SCARA Robots Using Dual Quaternions1,2," Pattern Recognition and Image Analysis, vol. 26, No. 1, pp. 231-239, 2016, (9 pages).

* cited by examiner

HAND-EYE CALIBRATION OF CAMERA-GUIDED APPARATUSES

CROSS-REFERENCE TO RELATED APPLICATIONS

This application claims priority from a European Patent Application having serial number 21175927.9, filed May 26, 2021, titled "HAND-EYE CALIBRATION OF CAMERA-GUIDED APPARATUSES," which is incorporated herein by reference in its entirety.

SUMMARY OF THE INVENTION

The invention describes a generic framework for hand-eye calibration of camera-guided apparatuses, wherein the rigid 3D transformation between the apparatus and the camera must be determined. An example of such an apparatus is a camera-guided robot. In contrast to conventional methods, the inaccuracy of the robot is explicitly modeled in a statistically sound way. This is also relevant to industrial robots, for example. Although the precision of modern industrial robots is high, their absolute accuracy is typically much lower. This inaccuracy worsens the result of the hand-eye calibration if the inaccuracy is not explicitly taken into account. The method proposed in the invention not only leads to high accuracy of the calculated hand-eye pose, but also provides reliable information about the accuracy of the robot. It further provides corrected robot poses that can be used for easy and inexpensive robot calibration. The described framework is generic in several respects: It supports the use of both a calibration body and self-calibration without the need for known 3D points. It optionally allows simultaneous calibration of the internal camera parameters. The framework is also generic with respect to the robot type, e.g., it supports both articulated arm and SCARA robots. In addition to applications involving industrial robots, also other applications using camera-guided robots or other camera-guided apparatuses may benefit from the invention.

BACKGROUND OF THE INVENTION

Hand-eye calibration is essential for applications with camera-guided apparatuses. For robots, it determines the rigid 3D transformation (pose) between the robot and the camera (hand-eye pose). This allows measurements made in the camera coordinate system to be transformed into the robot coordinate system. For example, in bin-picking applications with industrial robots, the pose of an object in the camera coordinate system is determined using 3D object recognition (Hofhauser et al., 2009; Ulrich et al., 2012). For being able to grasp the object with the robot, the object pose must be transformed into the robot's coordinate system.

For camera-guided medical robots, service robots and humanoid robots, it is also necessary to determine the pose of the robot or the robot hand with respect to the camera. For camera-guided autonomously navigating drones, the hand-eye calibration determines the pose between the camera and the drone's reference coordinate system. For example, the position of the drone's reference coordinate system with respect to a higher-level coordinate system can be determined using a global navigation satellite system (GNSS) and an inertial navigation system (INS). Similar considerations apply to camera-guided terrestrial robots (e.g., reconnaissance robots or rescue robots). In the operating room, apparatuses are increasingly used to assist the surgeon. In endoscopy, hand-eye calibration must be used to determine the position of the camera in the coordinate system of the endoscope or operating room. This similarly also applies to augmented reality applications in which hand-eye calibration must be used to determine the pose between the camera and the position and orientation sensor of the headset. Camera-guided cranes can be used to automate processes in the construction industry. Automated loading and unloading of container ships is also possible. Here, too, the position of the camera in the crane's coordinate system must be determined via hand-eye calibration. Even though the focus of the invention is on industrial robots and therefore the following descriptions are based on this scenario as an example, obviously further applications in which camera-guided apparatuses are used can benefit from the invention. In principle, this applies to all applications in which hand-eye calibration is useful. In the following, the term robot is therefore representative of all apparatuses in which hand-eye calibration is used.

In general, there are two scenarios of camera-guided robots (Steger et al. [Chapter 3.12.2], 2018): In the first scenario, the camera is mounted on the end effector of the robot and is moved with the robot to different positions. In the second scenario, the camera is mounted in a stationary manner outside the robot and therefore does not move with respect to the robot base. The pose to be determined by the hand-eye calibration is the relative pose of the camera with respect to the robot tool in the first scenario, or the relative pose of the camera with respect to the robot base in the second scenario. In the following, the description of the invention refers to the first scenario with a moving camera. However, it can also be applied to the second scenario with a stationary camera in an analogous manner.

Conventional approaches to hand-eye calibration assume that the pose of the robot tool is known accurately with respect to the robot base. For robot accuracy, it is important to distinguish between repeatability and absolute accuracy of the robot (ISO 9283:1998): Repeatability describes the ability of the robot to repeatedly move the tool to the same pose. Absolute accuracy is the ability of the robot to move the tool to a specific pose in 3D space. Modern industrial robots typically provide very high repeatability, ranging from 0.02-0.15 mm (Shiakolas et al., 2002; Abderrahim et al., 2006; Placzek et Piszszek, 2018). For applications in which the robot tool always takes the exact same pose that has been trained in advance, high repeatability is sufficient. However, for robots that are programmed offline, and especially for camera-guided robots, high absolute pose accuracy is also important. Unfortunately, the absolute pose accuracy of robots is often much lower than the repeatability. Absolute pose accuracy typically ranges from 0.1 to 10.0 mm, while orientation accuracy often ranges from about 0.2 degrees to several degrees (Abderrahim et al, 2006; Placzek and Piszczek, 2018).

Robotic calibration allows accuracy to be improved by up to an order of magnitude, and in rare cases even to repeatability (Shiakolas et al., 2002). Unfortunately, robotic calibration often requires high-precision measurement instruments such as laser trackers (Abderrahim et al., 2006) and is therefore expensive and time-consuming.

Almost all previous methods for hand-eye calibration assume error-free robot poses. The approach according to the invention explicitly models the robot's inaccuracy in a statistically sound manner, resulting in higher accuracy of the calculated hand-eye pose. Furthermore, the approach according to the invention provides reliable information about the robot's inaccuracy, which would otherwise require high-precision measurement instruments. Since the described method also provides error-corrected (calibrated) robot poses, the method also enables simple and inexpensive robot calibration.

Most existing approaches to hand-eye calibration require the capturing of multiple images of a calibration object. A few, more flexible and user-friendly solutions avoid the use of calibration objects. The method according to the invention supports both variants, calibration object-based calibration and self-calibration, without the need for known 3D points. In addition, the method according to the invention optionally allows for simultaneous calibration of the internal camera parameters for both variants, thus providing a high degree of user-friendliness.

PRIOR ART

FIG. 1 shows the coordinate systems relevant to hand-eye calibration of a robot (apparatus) with a moving camera. The case of a stationary camera is described, e.g., in Steger et al. ([Chapter 3.13], 2018) and shown in FIG. 2. Let $^{s2}H_{s1}$ be the 4×4 homogeneous transformation matrix representing a rigid 3D transformation of points from the coordinate system s1 to s2. One of the most common problem formulations of hand-eye calibration is based on the closure of the following transformation chain (Strobl and Hirzinger, 2006):

$$^{b}H_{w} = {}^{b}H_{t}{}^{t}H_{c}{}^{c}H_{w} \quad (1)$$

with the coordinate systems world (w, WCS), camera (c, CCS), robot tool (t, TCS), and robot base (b, BCS), and the unknown poses $^{t}H_{c}$ (hand-eye pose) and $^{b}H_{w}$. The unknown poses are typically determined by moving the robot to different poses and capturing an image of the calibration object defining the WCS in each pose. At each robot pose (apparatus pose), $^{b}H_{t}$ is interrogated by the robot controller and $^{c}H_{w}$ is determined by PnP algorithms or camera calibration (described, e.g., in Zhang, 2000).

Formula (2) is often written as follows:

$$Y = A_{i}XB_{i} \quad (2)$$

with the unknown poses X and Y and the observed poses $A_i$ and $B_i$ for each of the n robot poses i (i=1, ..., n). Since the essential unknown is X, Y can be eliminated by considering a pair of different robot poses i and j. By doing so, one obtains $A_j^{-1}A_iX = XB_jB_i^{-1}$. With $A = A_j^{-1}A_i$ and $B = B_jB_i^{-1}$ one obtains $$AX = XB, \quad (3)$$

wherein, as the robot is moved from pose i to j, the motion of the tool is represented by A and the motion of the camera is represented by B.

There are several linear approaches that essentially solve Equation (2) or Equation (3), e.g., Tsai and Lenz, 1989; Chen, 1991; Horaud and Dornaika, 1995; Dornaika and Horaud, 1998; Daniilidis, 1999; Andreff et al., 2001; Schmidt et al., 2003; Ulrich and Steger, 2016. They determine either the rotational and translational shares of the hand-eye pose sequentially or simultaneously. The latter has the advantage that rotational errors do not propagate, thereby amplifying translational errors. Approaches that solve Equation (3) require the selection of appropriate pairs of robot poses to compute A and B. Selection criteria for appropriate pose pairs are proposed in Tsai and Lenz, 1989; Schmidt et al., 2003; Schmidt and Niemann, 2008. Nevertheless, it remains difficult to ensure that the observed information ($A_i$ and $B_i$) is optimally exploited. Moreover, these approaches assume error-free robot poses (Tsai and Lenz, 1989).

Since linear approaches typically minimize an algebraic error, their accuracy is limited. Therefore, they are often used to initialize a subsequent nonlinear optimization to achieve higher accuracy. Most nonlinear approaches (Horaud and Dornaika 1995; Dornaika and Horaud, 1998; Daniilidis 1999; Schmidt et al., 2005; Ulrich and Steger, 2016; Steger [Chapter 3.13.5], 2018) that minimize either an algebraic or geometric error also assume error-free robot poses and often face the additional problem of how to weight the error components of rotation and translation relative to each other. Strobl and Hirzinger (2006) minimize a weighted sum of the rotation and translation error shares, wherein the weights for the error components are derived statistically. While this allows for errors in the robot poses $^{b}H_{t}$ to be taken into account, error-free camera poses $^{c}H_{w}$ are taken as input. Nguyen and Pham (2018) solve the rotation and translation parts of Equation (3) sequentially and propagate the errors in A and B to X.

Another class of approaches minimizes the back-projection error of 3D world points on a calibration object (e.g., Tabb and Yousef, 2017) similar to approaches for camera calibration such as Zhang (2000). Important advantages of this class of approaches are that it eliminates the need for explicit estimation of the camera position in each image in pre-processing, does not require pre-selection of pose pairs, and minimizes a meaningful geometric error in the space of the observed erroneous measurements, i.e., image points. Another advantage is that minimizing the back-projection error also allows simultaneous estimation of the inner camera parameters. However, these mentioned methods also assume error-free robot poses. In Koide and Menegatti (2019), a pose-graph optimization framework for hand-eye calibration was presented in which, in addition to the back-projection error of the points of a calibration object, also the errors of the robot poses are minimized. The advantage of taking into account the uncertainty of the robot poses has been demonstrated by experiments. Unfortunately, no details are given in the publication about the stochastic model, the optimization and the weighting of the different error components with respect to each other.

Self-calibration approaches are used to perform hand-eye calibration without a calibration object. In this approach, unknown 3D points are tracked in the image sequence obtained from a predefined robot motion. The inner camera parameters and the 3D points are estimated simultaneously with the hand-eye pose. In Andreff et al. (2001), a structure-from-motion (SfM) approach is used, where the unknown scaling factor of the SfM result is integrated into the equations. The idea is taken up in Schmidt et al. (2005), wherein the post-processing step to force orthogonality of the rotation matrix is avoided by introducing the unknown scaling factor into the equations of Horaud and Dornaika (1995) and Daniilidis (1999). Since the self-calibration techniques described minimize algebraic errors, the accuracy achievable with these approaches is limited.

The method according to the invention combines the aforementioned advantages of minimizing a back-projection error, the advantage of stochastically modeling the inaccuracy of all measured observations (image points and robot poses), the flexibility of performing either a calibration object-based calibration or a self-calibration, and the possibility of using known inner camera parameters or simultaneously estimating them.

According to a first aspect, the invention provides a hand-eye calibration method for determining the parameters of the hand-eye pose of camera-guided apparatuses. In this regard, the method comprises the following steps:

(a) controlling a plurality of apparatus poses with the apparatus;
(b) capturing a camera image at each apparatus pose;
(c) extracting image features in the captured camera images;
(d) determining approximate values for the parameters of the hand-eye pose; and
(e) determining the parameters of the hand-eye pose assuming erroneous apparatus poses and erroneous extracted image features to implicitly account for erroneous camera poses, which comprises the steps of
  (e1) statistically modeling the accuracies of the parameters describing the apparatus pose and the accuracies of the extracted image features, wherein the number of parameters describing the apparatus pose is at least equal to the number of degrees of freedom of the apparatus;
  (e2) optimizing the parameters of the hand-eye pose by simultaneously minimizing a back-projection error of the image features in the captured camera images and the errors in the parameters describing the apparatus pose, taking into account the accuracies from step (e1);
  (e3) computing improved accuracies of the parameters describing the apparatus pose and the extracted image features based on the results of the optimization from step (e2) using variance component estimation; and
  (e4) repeating steps (e1) through (e3) until the accuracies of the parameters describing the apparatus pose and the accuracies of the extracted image features converge.

Preferably, the apparatus is a robot and the apparatus poses represent robot poses. Alternatively, the apparatus may be an automated industrial crane and the apparatus poses represent crane poses.

In a first preferred embodiment, capturing a camera image at each apparatus pose in step (b) comprises capturing a camera image from a calibration object. Further preferably, extracting image features in the captured camera images in step (c) comprises extracting calibration marks on the calibration object in the captured camera images. Determining approximate values for the hand-eye pose parameters in step (d) preferably comprises the following steps: (d1) determining a camera pose for each apparatus pose using the calibration marks on the calibration object extracted in the camera image; and (d2) determining the approximate values for the hand-eye pose parameters using a hand-eye calibration approach using the camera poses and the apparatus poses.

In an alternative preferred embodiment, capturing a camera image at each apparatus pose in step (b) comprises capturing a camera image of a scene suitable for extracting salient image points. Further preferably, extracting image features in the captured camera images in step (c) comprises extracting salient image points in the captured camera images. Preferably, determining approximate values for the hand-eye pose parameters in step (d) comprises the following steps: (d1) determining a scaled camera pose for each apparatus pose using the salient image points extracted in the camera image; (d2) determining a normalization factor using the scaled camera poses and the apparatus poses; (d3) determining the camera poses by normalizing the scaled camera poses using the normalization factor; and (d4) determining the approximate values for the parameters of the hand-eye pose using a hand-eye calibration approach using the camera poses and the apparatus poses.

Preferably, the method further comprises determining improved (calibrated) apparatus poses from the result of optimizing the parameters of the hand-eye pose.

Further preferred is the further step of determining the accuracy of the apparatus from the result of optimizing the parameters of the hand-eye pose.

According to a further aspect, the invention provides a method in which steps (d) and (e2) are replaced by: (d) determining approximate values for the parameters of the hand-eye pose and for the parameters of an inner orientation of the camera; and (e2) optimizing the parameters of the hand-eye pose and the parameters of the inner orientation of the camera by simultaneously minimizing a back-projection error of the image features in the captured camera images and the errors in the parameters describing the apparatus pose, taking into account the accuracies from step (e1). In other words, the second aspect provides a method as follows:

(a) controlling a plurality of apparatus poses with the apparatus;
(b) capturing a camera image at each apparatus pose;
(c) extracting image features in the captured camera images;
(d) determining approximate values for the parameters of the hand-eye pose and for the parameters of an inner orientation of the camera; and
(e) determining the parameters of the hand-eye pose assuming erroneous apparatus poses and erroneous extracted image features to implicitly account for erroneous camera poses, which comprises the steps of
  (e1) statistically modeling the accuracies of the parameters describing the apparatus pose and the accuracies of the extracted image features, wherein the number of parameters describing the apparatus pose is at least equal to the number of degrees of freedom of the apparatus;
  (e2) optimizing the parameters of the hand-eye pose and the parameters of the inner orientation of the camera by simultaneously minimizing a back-projection error of the image features in the captured camera images and the errors in the parameters describing the apparatus pose, taking into account the accuracies from step (e1);
  (e3) computing improved accuracies of the parameters describing the apparatus pose and the extracted image features based on the results of the optimization from step (e2) using variance component estimation; and
  (e4) repeating steps (e1) through (e3) until the accuracies of the parameters describing the apparatus pose and the accuracies of the extracted image features converge.

In the Figures

Figure 2:
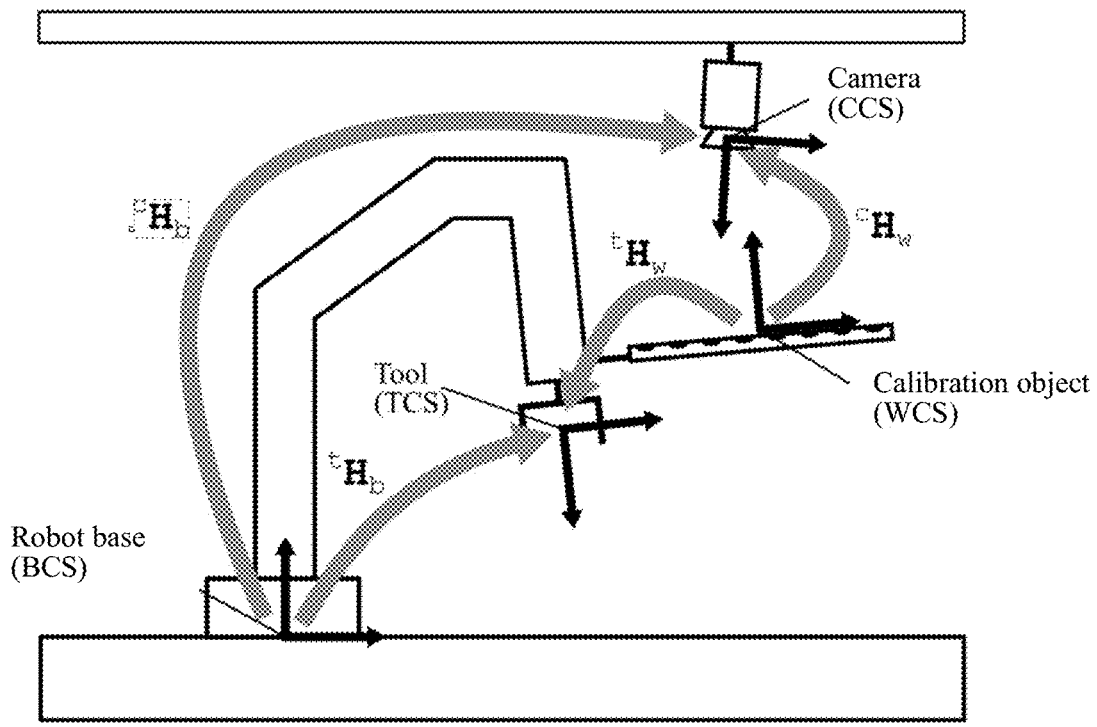

FIG. 1 shows the coordinate systems relevant to the hand-eye calibration of a robot (apparatus) with a moving camera; and FIG. 2 shows the coordinate systems relevant to the hand-eye calibration of a robot (apparatus) in the case of a stationary camera.

DETAILED DESCRIPTION OF THE INVENTION

First, the camera model and the calibration model underlying the invention are described, i.e., the relationship between 3D world points and their projection into the camera. For ease of description of the invention, it is assumed that the camera-guided apparatus is a camera-guided robot. The descriptions can be readily applied by a person skilled in the art to other camera-guided apparatuses as described above. Further, it is understood that the cameras are mounted on the end effector of the robot. Thus, the description of the invention primarily relates to the case of a moving camera. It is known from the literature that the case of a stationary camera is equivalent to the case of a moving camera. Therefore, in the following, the case of a stationary camera will be discussed only in those places where the equivalence is not obvious. Subsequently, three alternative optimization methods for hand-eye calibration are described. Finally, methods are described which provide the necessary initial values for the unknowns in the optimization procedures.

Camera Model

In a preferred embodiment of the invention, the camera is described by the perspective camera model described in Steger et al. ([Chapter 3.9.1], 2018): When using homogeneous coordinates, a 3D point $p_w$ in the WCS is transformed into a point $p_c$ in the CCS by $$p_c = {}^c H_w p_w = \begin{pmatrix} R & t \\ 0^\top & 1 \end{pmatrix} p_w, \qquad (4)$$

wherein $t = (t_x, t_y, t_z)^\top$ is a translation vector and R is a rotation matrix parameterized by Euler angles: $R = R_x(\alpha) R_y(\beta) R_z(\gamma)$. The parameters $(t_x, t_y, t_z, \alpha, \beta, \gamma)$ describe the outer orientation of the camera and thus represent a rigid transformation in 3D. In an alternative embodiment of the invention, the outer orientation is represented by another suitable parameterization. For example, the rotational part of the outer orientation may be represented by quaternions, or the entire outer orientation may be represented by dual quaternions (Daniilidis, 1999).

The point $p_c = (x_c, y_c, z_c)^\top$ is then projected into the image plane by $$\begin{pmatrix} x_u \\ y_u \end{pmatrix} = \frac{c}{z_c} \begin{pmatrix} x_c \\ y_c \end{pmatrix}, \qquad (5)$$

with the chamber constant c of the lens. In an alternative embodiment of the invention, other camera models can be used instead (e.g., for telecentric lenses, Steger et al. [Section 3.9], 2018). Subsequently, to account for lens distortions, the undistorted point $(x_u, y_u)^T$ is distorted to $(x_d, y_d)^T$. In a preferred embodiment of the invention, the division model (Lenz and Fritsch, 1990) is used to model lens distortion:

$$\begin{pmatrix} x_u \\ y_u \end{pmatrix} = \frac{1}{1 + \kappa r_d^2} \begin{pmatrix} x_d \\ y_d \end{pmatrix}, \qquad (6)$$

which models radially symmetric distortions by the parameter K. Thereby, $r_d^2 = x_d^2 + y_d^2$ applies. In another preferred embodiment of the invention, the polynomial model (Brown, 1971) is used, which models both radially symmetric and tangential distortions. In alternative embodiments of the invention, other alternative distortion models may be used in an obvious manner without departing from the scope of the invention.

Finally, the distorted point $(x_d, y_d)^T$ is transformed into the image coordinate system:

$$p_i = \begin{pmatrix} x_i \\ y_i \end{pmatrix} = \begin{pmatrix} x_d/s_x + c_x \\ y_d/s_y + c_y \end{pmatrix}, \qquad (7)$$

wherein $(c_x, c_y)^\top$ represents the image main point and $s_x$ and $s_y$ describe the horizontal and vertical distances of neighboring sensor elements.

The six parameters $i = (c, \kappa, s_x, s_y, c_x, c_y)^\top$ for the division model (or ten parameters for the polynomial model) describe the internal orientation of the camera.

Calibration Model

In hand-eye calibration, the apparatus is moved to different apparatus poses. In the case of the moving camera robot example used for the invention description, the robot's tool is moved to $n_r$ different poses and a camera image is captured in each of these robot poses. In the case of calibration object-based calibration, the calibration object is placed at a fixed position in the robot's workspace (see FIG. 1). In the case of self-calibration, camera images are captured instead from a scene suitable for the extraction of salient image points. This can be, for example, the capturing of a sufficiently structured object or that of an arbitrary but structured background scene. Let ${}^t H_{b,j}$ be the robot pose returned by the robot controller at the pose j (j=1, ... $n_r$). Further, let $p_k$ (k=1, ... $n_w$) be the 3D world points (given in WCS) of the calibration object or in the scene and their 2D projections into the image of the robot pose j be $p_{j,k}$. Then the projection of a 3D point into the image is described by:

$$p_{j,k} = \pi({}^c H_t {}^t H_{b,j} {}^b H_w p_k, i) \qquad (8)$$

wherein $\pi(p_c, i)$ represents the projection of a point $p_c$ given in the CCS into the image. In the case of the division model, for example, $\pi(p_c, i)$ corresponds to the successive execution of Equation (5), the inverses of Equation (6) and Equation (7) using the inner orientation i.

Finally, the vector $e_{t,j}$ includes the transformation parameters of the robot poses ${}^t H_{b,j}$, the vector $e_c$ includes the transformation parameters of the unknown hand-eye pose ${}^c H_t$, and the vector $e_b$, includes the transformation parameters of the unknown pose ${}^b H_w$ (analogous to the outer orientation parameters of ${}^c H_w$ described above). In a preferred embodiment of the invention, the transformation parameters are the three components of translation and the three Euler angles of rotation. In alternative embodiments, the rotational shares of the transformations are described by quaternions (4 parameters) or the transformations are described by dual quaternions (8 parameters). The invention further allows the use of other alternative parameterizations of the transformations, so that the invention can be easily integrated into existing methods. However, the number of parameters describing the robot poses ${}^t H_{b,j}$ must at least correspond to the number of degrees of freedom of the robot. For example, while most industrial robots cover 6 degrees of freedom, there are special robot designs that allow fewer degrees of freedom. An example of this are SCARA robots, which have only 4 degrees of freedom (3 translations and 1 rotation) (Ulrich and Steger, 2016). In contrast, overparametrization, such as is present when using quaternions or dual quaternions, is possible. Other camera-guided apparatuses may also have constrained degrees of freedom. For example, some terrestrial robots can move in the plane, but have no possibility to leave that plane. Since this means they can only rotate around one axis and move in two directions, they have only 3 degrees of freedom (1 rotation and 2 translations).

In the case of a stationary camera, a calibration object (for calibration object-based calibration) or a sufficiently structured object (for self-calibration) is mounted on the end effector of the robot and thus moved along with the robot. The stationary camera then captures a camera image of the co-moved object at each approached robot pose. In the case of self-calibration, it can be helpful to ensure that the background is as homogeneous and structureless as possible so that the position of the object can be detected as robustly and automatically as possible in the camera images. The pose $^cH_t$ in the moving case corresponds to the pose $^cH_b$ in the stationary case. The pose $^bH_w$ in the moving case corresponds to the pose $^tH_w$ in the stationary case. The role of the poses $^cH_w$ and $^tH_{b,j}$, however, remains unchanged.

Parameter Estimation in the Gauss-Markov Model

In the following, it is distinguished between the functional model and the stochastic model (Förstner and Wrobel, 2016). The functional model describes the relationships between the observations and the unknown parameters. In the stochastic model, the observations and the unknowns are treated as random variables with uncertainties, wherein the uncertainties are described by (co-)variances.

Assuming initially error-free robot poses, the hand-eye calibration problem can be formulated in the so-called Gauss-Markov model (Förstner and Wrobel [Chapter 4. 4], 2016), since all erroneous observations l can be expressed as a function l=$f$(x) of the unknown parameters x, wherein $f$ describes the functional model and corresponds to Equation (8).

The vector contains the measured image points $l = (p_{1,1}^\top, \ldots, p_{1,n_w}^\top, \ldots, p_{n_l,n_w}^\top)^\top$, i.e., the extracted image features in the captured camera images. In the case of calibration object-based calibration, in a preferred embodiment of the invention, the extracted image features represent the projection of the centers of circular marks on a calibration body (Steger and Ulrich, 2018). In an alternative embodiment of the invention, they represent the projection of the intersection points of a checkerboard pattern on a calibration body (OpenCV, 2021). In the case of self-calibration, the extracted image features represent salient image points that are computed using appropriate image processing operators in the images and mapped to each other over different images. Examples of such image processing operators are the Förstner point extractor (Förstner, 1994), the Harris point extractor (Harris and Stephens, 1988), and the SIFT point extractor (Lowe, 2004).

If a 3D point is not visible in a particular image, the corresponding entry in l is omitted. The sum of the measured image points over all images is denoted by $n_l$, i.e. the number of observations $n_l$ is $2n_i$. For each observed image point, two equations of form (8) are given. Thus, $2n_i$ equations are obtained. The structure of the vector x depends on the application scenario and can be determined according to the following set of rules:

For all scenarios, x contains the hand-eye pose: x:=$e_c$. For SCARA robots there is the peculiarity to consider that not all parameters of the hand-eye pose can be determined. For example, if the hand-eye pose is parameterized by 3 translation angles and 3 Euler angles, the robot pose parameter $t_z$ cannot be determined when calibrating SCARA robots. In this case, $t_z$ is set to 0 and excluded from the optimization (Ulrich and Steger, 2016).

For a calibration object-based calibration, x must be extended by the unknowns $e_b$: $x := (x^\top, e_b^\top)^\top$. In contrast, in the case of self-calibration, the 3D points can be reconstructed directly in the BCS. Therefore, in this case $e_b$ can be excluded from the unknowns and internally set to e.g. $e_b = (0,0,0,0,0,0)^\top$ for the case that $e_b$ is described by 3 rotation parameters and 3 translation parameters. For other parameterizations, the parameters can be chosen to describe the unit image in the chosen parameterization.

If the inner orientation of the camera is unknown and should be co-estimated at the same time, the vector with the unknowns is extended by the parameters of the inner orientation: $x := (x^\top, i^\top)^\top$. Note that u must typically be excluded from calibration to obtain a unique solution (Steger et al. [Chapter 3.9.4.2], 2018).

In the case of self-calibration, x must be extended by the coordinates of the 3D points: $x := (x^\top, p_1^\top, \ldots, p_{n_w}^\top)^\top$.

Let $n_x$ be the final number of unknown parameters in x.

The stochastic model specifies the statistical properties of the observation process. In the present case, erroneous extracted image features are assumed. Assuming that the image points are uncorrelated and measured with the same accuracy, the $n_l \times n_l$ weight coefficient matrix of the observations is set to the unit matrix: $Q_{ll}$=I.

For linearization, the $2n_l \times n_x$ Jacobian matrix A is set up, which includes the first derivatives of $f$ after the unknowns x, evaluated at the location of the initial values or current approximations for the unknowns $x^{(0)}$ (the determination of the initial values is described below):

$$A = \frac{\partial f(x)}{\partial x}\bigg|_{x=x^{(0)}}. \quad (9)$$

With $\Delta l = l - f(x^{(0)})$ and the weight matrix $P_{ll} = Q_{ll}^{-1}$, corrections $\Delta \hat{x}$ for the unknowns can now be calculated. This is done by solving

(10) $A^\top P_{ll} A \Delta \hat{x} = A^\top P_{ll} \Delta l$ after $\Delta \hat{x}$, e.g. by Cholesky decomposition using the sparse matrices (the roof operator ^ describes an estimated value in statistics). Thus, the improved unknowns result in $\hat{x}^{(1)} = x^{(0)} + \Delta \hat{x}$. Finally, Equations (9) and (10) are applied repeatedly until convergence. This corresponds to minimizing the back-projection error of the 3D points into the camera images.

After convergence, the covariance matrix of the original observations is obtained by $c_{ll} = \hat{\sigma}_0^2 Q_{ll}$, with the variance factor being $\hat{\sigma}_0^2 = \hat{v}^\top P_{ll} \hat{v}/r$, the residuals $\hat{v} = A\Delta \hat{x} - \Delta l$, and the redundancy $r = n_l - n_x$. The corrected observations are obtained by $\hat{l} = l + \hat{v}$. The covariance matrix of the estimated unknowns is obtained by variance propagation $c_{\hat{x}\hat{x}} = \hat{\sigma}_0^2 (A^\top P_{ll} A)^{-1}$.

In the following, two alternative procedure models (parameter estimation in the Gauss-Helmert model and parameter estimation in the Gauss-Markov model with fictitious unknowns) are now described for the determination of the parameters of the hand-eye pose under the assumption of erroneous robot poses and erroneous extracted image features for the implicit consideration of erroneous camera poses:

Parameter Estimation in the Gauss-Helmert Model

To account for erroneous robot poses, they must be introduced as observations in addition to the image coordinates of the extracted image features. Therefore, the observations can no longer be expressed as a function of the unknowns. Thus, parameter estimation can no longer be readily performed in the Gauss-Markov model. In one embodiment of the invention, the parameter estimation is therefore performed in the Gauss-Helmert model (Förstner and Wrobel [Chapter 4.8], 2016). The functional model becomes $f(x,l)=0$.

In this model, the vector l contains the erroneous observed image points of the extracted image features and the erroneous robot poses $l = (p_{1,1}^T, \ldots, p_{1,n_w}^T, \ldots, p_{n_t,n_w}^T, e_{t,1}^T, \ldots, e_{t,n_t}^T)^T$. The number of observation equations is still $2n_i$. However, the number of observations is now $n_l=2n_i+6n_r$ in the case where the robot poses are represented by 3 translation parameters and 3 rotation parameters. In the case of an alternative representation of the robot poses, $n_l$ would change accordingly, e.g., would be $n_l=2n_i+8n_r$ when using dual quaternions, since dual quaternions contain 8 parameters. The vector x of the unknowns is identical to that of the Gauss-Markov model.

Compared to the Gauss-Markov model, the stochastic model must additionally account for the uncertainties in the robot poses. Tests on real systems have shown that the errors in the robot poses are mean-free and Gaussian distributed (Strobl and Hirzinger, 2006).

The following statistical modeling therefore includes the accuracies of the parameters describing the robot pose and the accuracies of the extracted image features, wherein the number of parameters describing the robot pose is at least equal to the number of degrees of freedom of the robot.

Even assuming uncorrelated observations, the relative accuracy between different sets of observations must be known in order to set up $Q_{ll}$. For the case where the robot poses are represented by 3 translation angles and 3 Euler angles, the three observation groups are the image coordinates of the extracted image features, the Euler angles of the robot poses, and the translation components of the robot poses. Since this relative accuracy is not known in practice, approximate values are used to initialize $Q_{ll}$. The actual variances are then estimated using the concept of variance components of the observations (Förstner and Wrobel, 2016). In one embodiment of the invention, the unit matrix is used to initialize Qi: $Q_{ll}$: $Q_{ll}=I$. However, this may lead to an unnecessarily high number of iterations to estimate the variance components. Therefore, in a preferred embodiment of the invention, the variances are initialized with more reasonable values. For example, one possibility when using Euler angles is to set the standard deviations of the image points to $\sigma_i=0.1$ pixels, those of the Euler angles to $\sigma_a=0.1$ degrees, and those of the translation components to $\sigma_t=1$ min. Then $Q_{ll}=\text{diag}(\text{rep}(\sigma_i^2,2n_i), \text{rep}([\sigma_a^2,\sigma_a^2,\sigma_a^2,\sigma_t^2,\sigma_t^2,\sigma_t^2],n_r))$, wherein the function generates a vector containing n copies of y.

The Jacobian matrix A is the same as in the Gauss-Markov model. In the Gauss-Helmert model, $f$ must be linearized also with respect to the observations. The derivations with respect to the observations are stored in the $2n_i \times n_l$ Jacobian matrix B.

$$B = \left.\frac{\partial f(x,l)}{\partial l}\right|_{x=x^{(0)}}. \quad (11)$$

The left upper $2n_i \times n_l$ submatrix of B is a diagonal matrix in which all diagonal elements are set to $-1$.

With $w=f(x^{(0)},l)$, the corrections for the unknowns can now be calculated. For this $_{(12)} A^T(BQ_{ll}B^T)^{-1}A\Delta\hat{x} = -A^T(BQ_{ll}B^T)^{-1}w$ must be solved to $\Delta\hat{x}$ (Förstner and Wrobel, 2016).

Accordingly, this model optimizes the parameters of the hand-eye pose by simultaneously minimizing a back-projection error of the image features in the captured camera images and the errors in the parameters describing the robot pose, taking into account the accuracies of the parameters describing the robot poses and the accuracies of the extracted image features.

After convergence of the optimization, the variance components for each observation group are estimated using the results of the optimization. When Euler angles are used, the variance component estimation yields corrected values for $\sigma_i$, $\sigma_a$ and $\sigma_t$ and thus a corrected matrix $Q_{ll}$. The procedure for estimating variance components is described in Förstner and Wrobel ([Section 4.2.4], 2016). The calculation of $\hat{v}$ and $\hat{l}$ in the Gauss-Helmert model can be looked up in Förstner and Wrobel (2016). Variance component estimation yields improved accuracies of the parameters describing the robot pose and of the extracted image features.

Finally, the optimization described above is performed again with the improved accuracies. Finally, the statistical modeling, optimization, and variance component estimation are repeated until the accuracies of the parameters converge. In practice, this is typically after 3 to 5 iterations.

Optionally, the covariance matrix of the observations is obtained by $c_{ll}=\hat{\sigma}_0^2 Q_{ll}$ with the redundancy $r=2n_i-n_x$. The covariance matrix of the estimated unknowns is obtained by $C_{\hat{x}\hat{x}} = \hat{\sigma}_0^2(A^T(BQ_{ll}B^T)^{-1}A)^{-1}$.

Another advantage of this approach is that the camera poses need not be assumed to be known and error-free. By allowing the camera poses to be expressed via the concatenation of erroneous observed or estimated transformations $^cH_w = {^cH_t}\, {^tH_{b,j}}\, {^bH_w}$, the approach implicitly accounts for erroneous camera poses.

Parameter Estimation in the Gauss-Markov Model with Fictitious Unknowns

Due to the computationally intensive matrix operations in the Gauss-Helmert model, in a preferred embodiment of the invention parameter estimation is performed in a more efficient variant of the Gauss-Markov model. This is equivalent to parameter estimation in the Gauss-Helmert model (Koch, 1999; Koch, 2007). Here, the robot poses are introduced as so-called fictitious unknowns.

The underlying idea here is to introduce the uncertain robot poses simultaneously as observations and as unknowns. The first part of the functional model is still $l=f(x)$. However, unlike the estimation in the Gauss-Markov model described above, 6 additional observation equations of the form $e_{t,j}=f_2(e_{t,j})$ for each robot pose j are now added for the case where the robot poses are represented by 3 translation parameters and 3 rotation parameters. For example, using quanternions for the rotations would add 7 additional observation equations per robot pose, while using dual quanternions would add, e.g., 8. Here, the function $f_2$ corresponds to the identity. This now gives $2n_i+6n_r$ equations for the case where the robot poses are represented by 3 translation parameters and 3 rotation parameters. Thus, the vector contains the observed image points and the robot poses $l = (p_{1,1}^T, \ldots, p_{1,n_w}^T, \ldots, p_{n_t,n_w}^T, e_{t,1}^T, \ldots, e_{t,n_t}^T)^T$ analogous to the Gauss-Helmert model described above. At the same time, the robot poses are now also introduced as unknowns by extending the unknown vector accordingly:

$x := (x^T, e_{t,1}^T, \ldots, e_{t,n_t}^T)^T$.

Since l is identical to that in the Gauss-Helmert model, the same stochastic model can be applied for the statistical modeling of the accuracies and for the case where the robot poses are represented by 3 translation parameters and 3 rotation parameters, $Q_{ll}=\text{diag}(\text{rep}(\sigma_i^2, 2n_i), \text{rep}([\sigma_a^2, \sigma_a^2, \sigma_a^2, \sigma_t^2, \sigma_t^2, \sigma_t^2], n_r))$ can be initialized.

Thus, even in the Gauss-Markov model with fictitious unknowns, the statistical modeling includes the accuracies of the parameters describing the robot pose and the accuracies of the extracted image features, wherein the number of parameters describing the robot pose is at least equal to the number of degrees of freedom of the robot.

The computation of the $(2n_i+6n_r) \times n_x$ Jacobian matrix A (for the case where the robot poses are represented by 6 parameters) and of the corrections $\Delta \hat{x}$ is done by Equations (9) and (10). In this case, the lower left part of A contains zeros and the lower right part $I_{6n_r \times 6n_r}$.

Thus, also this model optimizes the parameters of the hand-eye pose by simultaneously minimizing a back-projection error of the image features in the captured camera images and the errors in the parameters describing the robot pose while taking into account the accuracies of the parameters describing the robot poses and the accuracies of the extracted image features.

After convergence, the variance components for the observation groups are estimated using the results of the optimization as described in Förstner and Wrobel (2016) or Niemeier ([Chapter 9.3], 2008). Variance component estimation yields improved accuracies of the parameters describing the robot pose and of the extracted image features.

Finally, the optimization described above is performed again with the improved accuracies. Finally, the statistical modeling, optimization, and variance component estimation are repeated until the accuracies of the parameters converge. In practice, this is typically after 3 to 5 iterations.

Optionally, $c_{ll}=\hat{\sigma}_0^2 Q_{ll}$, $\hat{l}$ and $c_{\hat{x}\hat{x}}$ are computed as in the parameter estimation in the Gauss-Markov model described above.

Like the previously described approach in the Gauss-Helmert model, also the approach of parameter estimation in the Gauss-Markov model with fictitious unknowns has the advantage that the camera poses do not have to be assumed to be known and error-free. By allowing the camera poses to be expressed via the concatenation of erroneous observed or estimated transformations ${}^{c}H_{w}={}^{c}H_{t}\,{}^{t}H_{b,j}\,{}^{b}H_{w}$, the approach implicitly also accounts for erroneous camera poses.

Determination of Approximate Values for the Unknown Parameters

In a preferred embodiment of the invention, the initial values of the unknowns and in particular the approximate values for the parameters of the hand-eye pose are set by the following procedure:

Approximate values for the hand-eye pose $e_c$ and for $e_b$ are obtained from any hand-eye calibration approach known from the literature and suitable for these purposes. In a preferred embodiment of the invention, a linear approach to hand-eye calibration is used for this purpose, e.g., the approach of Daniilidis (1999). In the approach of Daniilidis (1999), but also in some other approaches, this requires the prior determination of a camera pose for each robot pose based on the calibration marks on the calibration object extracted in the camera image. The determination of the approximate values for the hand-eye pose parameters is then performed by a hand-eye calibration approach using the camera poses and the robot poses.

The initial values for the inner orientation are obtained from the data sheets of the camera ($s_x$ and $s_y$) and the lens (C). The image principal point $(c_x, c_y)^T$ set to the center of the image and the distortion coefficients are set to 0.

In the case of self-calibration, the determination of approximate values for the parameters is performed as follows: In a preferred embodiment of the invention, a SfM approach is performed on the captured camera images. A possible suitable SfM implementation is for example COLMAP (Schönberger and Frahm, 2016; Schönberger et al, 2016). The SfM approach provides the parameters of the inner orientation i, scaled reconstructed 3D points $p_k$, for each image j the extracted 2D points of the image features $p_{j,k}$, and a scaled outer orientation (i.e. camera pose) ${}^{c}H_{w,j}$.

In an alternative embodiment of the invention, any other suitable approaches known in the literature for determining initial values or additional knowledge from the specific application can be used to initialize the unknowns.

In the case of self-calibration, the inherently unknown scaling factor in the SfM approach must be determined in the initial values for $p_k$ and ${}^{c}H_{w,j}$. For this purpose, the normalization factor is first determined using the scaled camera poses and the robot poses. In a preferred embodiment of the invention, the camera motion ${}^{c2}H_{c1}={}^{c}H_{w,j2}\,{}^{c}H_{w,j1}^{-1}$ and the tool motion ${}^{t2}H_{t1}={}^{t}H_{b,j2}\,{}^{t}H_{b,j1}^{-1}$ are calculated for all pairs of robot poses $j_1$ and $j_2$. Both rigid 3D transformations are then converted to the parameters of a screw (Daniilidis, 1999). The congruence theorem (Chen, 1991) states that the translation parameter $d_t$ of the screw of the tool motion is identical to the translation parameter of the screw of the camera motion. Thus, the ratio $d_t/d_c$ reflects the unknown scale factor of the SfM approach and hence the sought normalization factor. In one embodiment of the invention, the average is calculated over the ratios of all pairs. In a preferred embodiment of the invention, the median of the ratios of all pairs is calculated for higher robustness, ignoring ratios for which $d_t$ or $d_c$ is below a noise threshold.

Finally, the determined normalization factor is used to normalize the scaled reconstructed 3D points $p_k$ and the scaled outer orientation (i.e., camera poses) ${}^{c}H_{w,j}$.

Determination of the Accuracy of the Robot

In both the Gauss-Helmert model and the Gauss-Markov model with fictitious unknowns, the results of optimizing the parameters of the hand-eye pose can be used to determine the accuracy of the robot. The estimation of the variance components allows to make a meaningful statement about the accuracy of the robot, which would normally require an involved robot calibration. The accuracy of the robot can be read directly from the matrix $c_{ll}$ resulting after the variance component estimation. In a preferred embodiment of the invention, in which the robot poses are described by 3 translation parameters and 3 rotation parameters, the variances of the translation parameters and the rotation parameters of the robot poses are averaged separately over all robot poses for this purpose, so that the accuracy of the robot can be presented in the form of two values.

Determination of Calibrated Robot Poses

In both the Gauss-Helmert model and the Gauss-Markov model with fictitious unknowns, it is possible to determine improved (calibrated) robot poses based on the results of optimizing the parameters of the hand-eye pose. By introducing the robot poses as observations, the vector $\hat{l}$ contains the balanced robot poses in addition to the balanced image coordinates. These can be considered as corrected or calibrated robot poses. Thus, they can be used as a basis for simple and inexpensive robot calibration.

Advantages of the Invention

Explicitly modeling the uncertainty of an apparatus is advantageous for hand-eye calibration. It improves accuracy, provides calibrated apparatus poses, and gives information about the uncertainty of the apparatus. This is important, for example, in industrial robots used for tasks that require high accuracy. The parameter estimation in the Gauss-Markov model with fictitious unknowns combined with the estimation of variance components proposed in the invention provides a statistically sound representation of the problem. Different hand-eye calibration scenarios (e.g., calibration object-based calibration, self-calibration; calibration of different apparatuses, e.g., articulated-arm industrial robots, SCARA industrial robots, terrestrial exploration robots; unknown or known inner orientation) can be easily represented by adding or removing the appropriate parameters to or from the parameter vectors. Thus, a large number of applications can benefit from this invention.

REFERENCES

M. Abderrahim, A. Khamis, S. Garrido, and L. Moreno, "Accuracy and calibration issues of industrial manipulators", in Industrial Robotics: Programming, Simulation and Application. IntechOpen, 2006, pp. 131-146.

N. Andreff, R. Horaud, and B. Espiau, "Robot hand-eye calibration using structure-from-motion", The International Journal of Robotics Research, vol. 20, no. 3, pp. 228-248, 2001.

D. C. Brown, "Close-range camera calibration", Photogrammetric Engineering, vol. 37, no. 8, pp. 855-866, August 1971.

H. H. Chen, "A screw motion approach to uniqueness analysis of headeye geometry", in Computer Vision and Pattern Recognition, 1991, pp. 145-151.

K. Daniilidis, "Hand-eye calibration using dual quaternions", International Journal of Robotics Research, vol. 18, no. 3, pp. 286-298, 1999.

F. Dornaika and R. Horaud, "Simultaneous robot-world and hand-eye calibration", IEEE Transactions on Robotics and Automation, vol. 14, no. 4, pp. 617-622, 1998.

W. Förstner, "A Framework for Low Level Feature Extraction", in: Jan-Olof Eklundh, eds.: Third European Conference on Computer Vision, Lecture Notes in Computer Science, vol. 801, pp. 383-394, Springer, 1994.

W. Förstner and B. P. Wrobel, Photogrammetric Computer Vision: Statistics, Geometry, Orientation and Reconstruction. Springer International Publishing, 2016.

C. Harris, M. Stephens, "A Combined Corner and Edge Detector", Proceedings of the Fourth Alvey Vision Conference, pp. 147-151, 1988.

A. Hofhauser, C. Steger, and N. Navab, "Perspective planar shape matching", in Image Processing: Machine Vision Applications II, ser. Proc. SPIE 7251, K. S. Niel and D. Fofi, Eds., 2009.

R. Horaud and F. Dornaika, "Hand-eye calibration", International Journal of Robotics Research, vol. 14, no. 3, pp. 195-210, 1995.

ISO 9283:1998, "Manipulating industrial robots—performance criteria and related test methods", 1998.

K.-R. Koch, Parameter Estimation and Hypothesis Testing in Linear Models. Berlin Heidelberg: Springer, 1999.

K.-R. Koch, Introduction to Bayesian Statistics, 2nd ed. Heidelberg: Springer, 2007.

K. Koide and E. Menegatti, "General hand—eye calibration based on reprojection error minimization", IEEE Robotics and Automation Letters, vol. 4, no. 2, pp. 1021-1028, April 2019.

R. Lenz and D. Fritsch, "Accuracy of videometry with CCD sensors", ISPRS Journal of Photogrammetry and Remote Sensing, vol. 45, no. 2, pp. 90-110, 1990.

D. G. Lowe, "Distinctive Image Features from Scale-Invariant Keypoints", International Journal of Computer Vision 60(2): pp. 91-110, 2004.

W. Niemeier, "Ausgleichungsrechung-Statistische Auswertennethoden", 2. überarbeitete and erweiterte Auflage, de Gruyter, Berlin, 2008.

H. Nguyen and Q. Pham, "On the covariance of X in AX=XB", IEEE Transactions on Robotics, vol. 34, no. 6, pp. 1651-1658, 2018.

OpenCV, "Open Computer Vision", Version 4.5.2, Open CV module calib3d, https://docs.opencv.org/4.5.2/d8/d0c/groups_calib3d.html, accessed 7.4.2021, 2021.

M. Placzek and t. Piszczek, "Testing of an industrial robot's accuracy and repeatability in off and online environments", Eksploatacja i Niezawodnosc—Maintenance and Reliability, vol. 20, no. 3, pp. 455-464, 2018.

J. Schmidt and H. Niemann, "Data selection for hand-eye calibration: A vector quantization approach", The International Journal of Robotics Research, vol. 27, no. 9, pp. 1027-1053, 2008.

J. Schmidt, F. Vogt, and H. Niemann, "Robust hand-eye calibration of an endoscopic surgery robot using dual quaternions", in Pattern Recognition, B. Michaelis and G. Krell, Eds. Springer Berlin Heidelberg, 2003, pp. 548-556.

J. Schmidt, F. Vogt, and H. Niemann, "Calibration-free hand-eye calibration: A structure-from-motion approach", in Pattern Recognition, W. G. Kropatsch, R. Sablatnig, and A. Hanbury, Eds. Springer Berlin Heidelberg, 2005, pp. 67-74.

J. L. Schönberger and J. M. Frahm, "Structure-from-motion revisited", in Conference on Computer Vision and Pattern Recognition (CVPR), 2016.

J. L. Schönberger, E. Zheng, M. Pollefeys, and J.-M. Frahm, "Pixelwise view selection for unstructured multi-view stereo", in European Conference on Computer Vision (ECCV), 2016.

P. Shiakolas, K. Conrad, and T. Yih, "On the accuracy, repeatability, and degree of influence of kinematics parameters for industrial robots", International Journal of Modelling and Simulation, vol. 22, no. 4, pp. 245-254, 2002.

K. H. Strobl and G. Hirzinger, "Optimal hand-eye calibration", in 2006 IEEE/RSJ International Conference on Intelligent Robots and Systems, 2006, pp. 4647-4653.

C. Steger, M. Ulrich, and C. Wiedemann, Machine Vision Algorithms and Applications, 2nd ed. Weinheim: Wiley-VCH, 2018.

A. Tabb and K. M. A. Yousef, "Solving the robot-world handeye(s) calibration problem with iterative methods", Machine Vision and Applications, vol. 28, no. 5, pp. 569-590, August 2017.

R. Y. Tsai and R. K. Lenz, "A new technique for fully autonomous and efficient 3D robotics hand/eye calibration", IEEE Transactions on Robotics and Automation, vol. 5, no. 3, pp. 345-358, June 1989.

M. Ulrich and C. Steger, "Hand-eye calibration of SCARA robots using dual quaternions", Pattern Recognition and Image Analysis, vol. 26, no. 1, pp. 231-239, 2016.

M. Ulrich, C. Wiedemann, and C. Steger, "Combining scale-space and similarity-based aspect graphs for fast 3D object recognition", IEEE Transactions on Pattern Analysis and Machine Intelligence, vol. 34, no. 10, pp. 1902-1914, October 2012.

Z. Zhang, "A flexible new technique for camera calibration", IEEE Transactions on Pattern Analysis and Machine Intelligence, vol. 22, no. 11, pp. 1330-1334, November 2000.

The invention claimed is:

1. A hand-eye calibration method for determining the parameters of the hand-eye pose of camera-guided apparatuses, the method comprising the following steps:
   (a) controlling a plurality of apparatus poses with the apparatus;
   (b) capturing a camera image at each apparatus pose;
   (c) extracting image features in the captured camera images;
   (d) determining approximate values for the parameters of the hand-eye pose; and
   (e) determining the parameters of the hand-eye pose assuming erroneous apparatus poses and erroneous extracted image features to implicitly account for erroneous camera poses, which comprises the steps of
      (e1) statistically modeling the accuracies of the parameters describing the apparatus pose and the accuracies of the extracted image features by a weight matrix, a weight coefficient matrix, or a covariance matrix, wherein the number of parameters describing the apparatus pose is at least equal to the number of degrees of freedom of the apparatus;
      (e2) optimizing the parameters of the hand-eye pose by simultaneously minimizing a back-projection error of the image features in the captured camera images and the errors in the parameters describing the apparatus pose, taking into account the accuracies from step (e1);
      (e3) computing improved accuracies of the parameters describing the apparatus pose and the extracted image features based on the results of the optimization from step (e2) using variance component estimation; and
      (e4) repeating steps (e1) through (e3) until the accuracies of the parameters describing the apparatus pose and the accuracies of the extracted image features converge.

2. The method according to claim 1, wherein the apparatus is a robot and apparatus poses represent robot poses.

3. The method according to claim 1, wherein capturing a camera image at each apparatus pose in step (b) comprises capturing a camera image from a calibration object, and wherein extracting image features in the captured camera images in step (c) comprises extracting calibration marks on the calibration object in the captured camera images.

4. The method according to claim 1, wherein capturing a camera image at each apparatus pose in step (b) comprises capturing a camera image of a scene suitable for extracting salient image points, and wherein extracting image features in the captured camera images in step (c) comprises extracting salient image points in the captured camera images.

5. The method according to claim 3, wherein determining approximate values for the hand-eye pose parameters in step (d) comprises the following steps:
   (d1) determining a camera pose for each apparatus pose using the calibration marks on the calibration object extracted in the camera image; and
   (d2) determining the approximate values for the hand-eye pose parameters using a hand-eye calibration approach using the camera poses and the apparatus poses.

6. The method according to claim 4, wherein determining approximate values for the hand-eye pose parameters in step (d) comprises the following steps:
   (d1) determining a scaled camera pose for each apparatus pose using the salient image points extracted in the camera image, wherein the scaled camera pose is a camera pose that is subject to an unknown scaling factor;
   (d2) determining a normalization factor as a ratio of the translation parameters between apparatus poses and scaled camera poses;
   (d3) determining the camera poses by normalizing the scaled camera poses using the normalization factor; and
   (d4) determining the approximate values for the parameters of the hand-eye pose using a hand-eye calibration approach using the camera poses and the apparatus poses.

7. The method according to claim 1, further comprising the step:
   (f) determining improved (calibrated) apparatus poses from the result of optimizing the parameters of the hand-eye pose.

8. The method according to claim 1, further comprising the step:
   (f) determining the accuracy of the apparatus from the result of optimizing the parameters of the hand-eye pose.

9. The method according to claim 1, wherein steps (d) and (e2) are replaced by:
   (d) determining approximate values for the parameters of the hand-eye pose and for the parameters of an inner orientation of the camera; and
   (e2) optimizing the parameters of the hand-eye pose and the parameters of the inner orientation of the camera by simultaneously minimizing a back-projection error of the image features in the captured camera images and the errors in the parameters describing the apparatus pose, taking into account the accuracies from step (e1).

* * * * *